(12) United States Patent
Deng (10) Patent No.: US 7,346,510 B2
(45) Date of Patent: Mar. 18, 2008

(54) METHOD OF SPEECH RECOGNITION USING VARIABLES REPRESENTING DYNAMIC ASPECTS OF SPEECH

(75) Inventor: Li Deng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1303 days.

(21) Appl. No.: 10/100,717

(22) Filed: Mar. 19, 2002

(65) Prior Publication Data

US 2003/0182110 A1    Sep. 25, 2003

(51) Int. Cl.
    *G10L 15/04*     (2006.01)
(52) U.S. Cl. ...................... 704/254; 704/256
(58) Field of Classification Search ............ None
See application file for complete search history.

(56) References Cited

U.S. PATENT DOCUMENTS

| | | | | |
|---|---|---|---|---|
| 4,918,735 | A | 4/1990 | Morito et al. | 704/233 |
| 4,980,917 | A * | 12/1990 | Hutchins | 704/254 |
| 5,012,519 | A | 4/1991 | Adlersberg et al. | 704/226 |
| 5,924,065 | A | 7/1999 | Eberman et al. | 704/231 |
| 6,092,045 | A | 7/2000 | Stubley et al. | 704/254 |
| 6,778,954 | B1 | 8/2004 | Kim et al. | 704/226 |

OTHER PUBLICATIONS

L. Deng, "A Dynamic, Feature-Based Approach to the Interface Between Phonology and Phonetics for Speech Modeling and Recognition," Speech Communication, vol. 24, No. 4, pp. 299-323 (1998).

L. Deng and Z. Ma, "Spontaneous Speech Recognition Using A Statistical Coarticulatory Model for the Hidden Vocal-Tract-Resonance Dynamics," J. Acoust. Soc. Am., vol. 108, No. 6, pp. 3036-3048 (2000).

L. Deng and J. Ma, "A Statistical Coarticulatory Model for the Hidden Vocal-Tract-Resonance Dynamics," Proc. of Eurospeech, vol. 4, pp. 1499-1502 (Sep. 1999).

L. Deng and H. Sameti, "Transitional Speech Units and Their Representation by the Regressive Markov States: Applications to Speech Recognition," IEEE Trans. Speech Audio Proc., vol. 4, No. 4, pp. 301-306 (Jul. 1996).

L. Deng and D. Sun, "A Statistical Approach to Automatic Speech Recognition Using the Atomic Speech Units Constructed from Overlapping Articulatory Features," J. Acoust. Soc. Am., vol. 95, pp. 2702-2719 (1994).

(Continued)

*Primary Examiner*—Abul K. Azad
(74) *Attorney, Agent, or Firm*—Theodore M. Magee; Westman, Champlin & Kelly, P.A.

(57) ABSTRACT

A method and computer-readable medium are provided that determine predicted acoustic values for a sequence of hypothesized speech units using modeled articulatory or VTR dynamics values and using the modeled relationship between the articulatory (or VTR) and acoustic values for the same speech events. Under one embodiment, the articulatory (or VTR) dynamics value depends on articulatory dynamics values at pervious time frames and articulation targets. In another embodiment, the articulatory dynamics value depends in part on an acoustic environment value such as noise or distortion. In a third embodiment, a time constant that defines the articulatory dynamics value is trained using a variety of articulation styles. By modeling the articulatory or VTR dynamics value in these manners, hyper-articulated, hypo-articulated, fast, and slow speech can be better recognized and the requirement for the training data can be reduced.

33 Claims, 7 Drawing Sheets

OTHER PUBLICATIONS

Y. Gao et al., "Multistage Coarticulation Model Combining Articulatory, Formant and Cepstral Features," Poc. ICSLP. vol. 1, pp. 25-28 (2000).

J. Ma and L. Deng, "A Path-Stack Algorithm for Optimizing Dynamic Regimes in a Statistical Hidden Dynamic Model of Speech," Computer Speech and Language, vol. 14, pp. 101-104 (2000).

M. Ostendorf et al., "From HMMs to Segment Models: A Unified View of Stochastic Modeling for Speech Recognition," IEEE Trans. Speech Audio Proc., vol. 4, pp. 360-378 (1996).

J. Ma and L. Deng, "Target-Directed Mixture Linear Dynamic Models for Spontaneous Speech Recognition," IEEE Trans. Speech and Audio Processing (submitted 1999, to appear 2002).

J. Bridle et al., "The WS98 Final Report on the Dynamic Model," http://www.clsp.jhu.edu/ws98/projects/dynamic/presentations/finalhtml/index.html, Johns Hopkins Univ. 1998).

F. -L. Chen et al., "The Structure and Its Implementation of Hidden Dynamic HMM for Mandarin Speech Recognition," Proc. ICSLP, pp. 713-716, Denver (2002).

Li Deng and Jeff Ma, "Spontaneous speech recognition using a statistical coarticulatory model for the vocal-tract-resonance dynamics," J. Acoust. Soc. Am. 105(5), Pt. 1, Nov. 2002.

Jeff Ma and Li Deng, "A path-stack algorithm for optimizing dynamic regimes in a statistical hidden dynamic model of speech," *Computer Speech and Language 2000*, 00, 1-14.

\* cited by examiner

METHOD OF SPEECH RECOGNITION USING VARIABLES REPRESENTING DYNAMIC ASPECTS OF SPEECH

BACKGROUND OF THE INVENTION

The present invention relates to pattern recognition. In particular, the present invention relates to speech recognition.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

Many speech recognition systems utilize Hidden Markov Models in which phonetic units are represented by a single tier of connected states. Using a training signal, probability distributions for occupying the states and for transitioning between states are determined for each of the phonetic units. To decode a speech signal, the signal is divided into frames and each frame is transformed into a feature vector. The feature vectors are then compared to the distributions for the states to identify a most likely sequence of HMM states that can be represented by the frames. The phonetic unit that corresponds to that sequence is then selected.

Although HMM-based recognition systems perform well in many relatively simple speech recognition tasks, they do not model some important dynamic aspects of speech directly (and are known to perform poorly for difficult tasks such as conversational speech). As a result, they are not able to accommodate dynamic articulation differences between the speech signals used for training and the speech signal being decoded. For example, in casual speaking settings, speakers tend to hypo-articulate, or under articulate their speech. This means that the trajectory of the user's speech articulation may not reach its intended target before it is redirected to a next target. Because the training signals are typically formed using a "reading" style of speech in which the speaker provides more fully articulated speech material than in hypo-articulated speech, the hypo-articulated speech does not match the trained HMM states. As a result, the recognizer provides less than ideal recognition results for casual speech.

A similar problem occurs with hyper-articulated speech. In hyper-articulated speech, the speaker exerts an extra effort to make the different sounds of their speech distinguishable. This extra effort can include changing the sounds of certain phonetic units so that they are more distinguishable from similar sounding phonetic units, holding the sounds of certain phonetic units longer, or transitioning between sounds more abruptly so that each sound is perceived as being distinct from its neighbors. Each of these mechanisms makes it more difficult to recognize the speech using an HMM system because each technique results in a set of feature vectors for the speech signal that do not match well to the feature vectors present in the training data.

HMM systems also have trouble dealing with changes in the rate at which people speak. Thus, if someone speaks slower or faster than the training signal, the HMM system will tend to make more errors decoding the speech signal.

Alternatives to HMM systems have been proposed. In particular, it has been proposed that the trajectory or articulatory behavior of the speech signal should be modeled directly. However, the exact interactions between the trajectory of the speech signal and other model parameters have not been determined. In addition, the frameworks for these proposed models have not provided a mechanism for handling hypo-articulated or hyper-articulated speech.

In light of this, a speech recognition framework is needed that explicitly models the articulatory behavior of speech in terms of other model variables such that hypo-articulated and hyper-articulated speech may be better recognized.

SUMMARY OF THE INVENTION

A method and computer-readable medium are provided that determine a predicted speech value for a hypothesis speech unit using an articulatory dynamics value. Under one embodiment, the articulatory dynamics value depends on a articulatory dynamics value at a pervious time and an articulation target. In other embodiments, the articulatory dynamics value depends in part on an acoustic environment value such as noise or distortion. In a third embodiment, a time constant that defines the articulatory dynamics value is trained using a variety of articulation styles. By modeling the articulatory dynamics value in these manners, hyper-articulated, hypo-articulated, fast, and slow speech can be better recognized.

DETAILED DESCRIPTION OF ILLUSTRATIVE EMBODIMENTS

Figure 1:
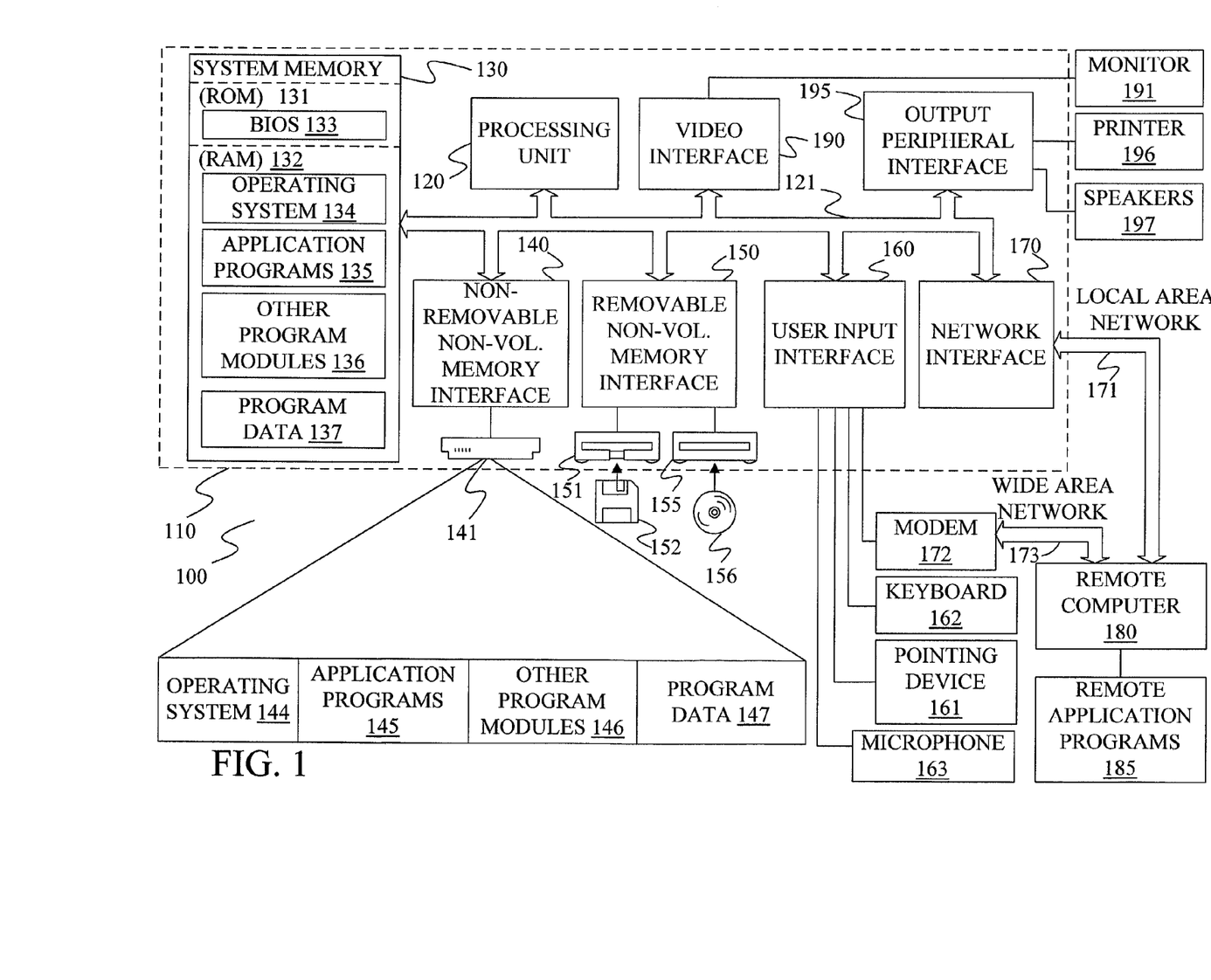
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
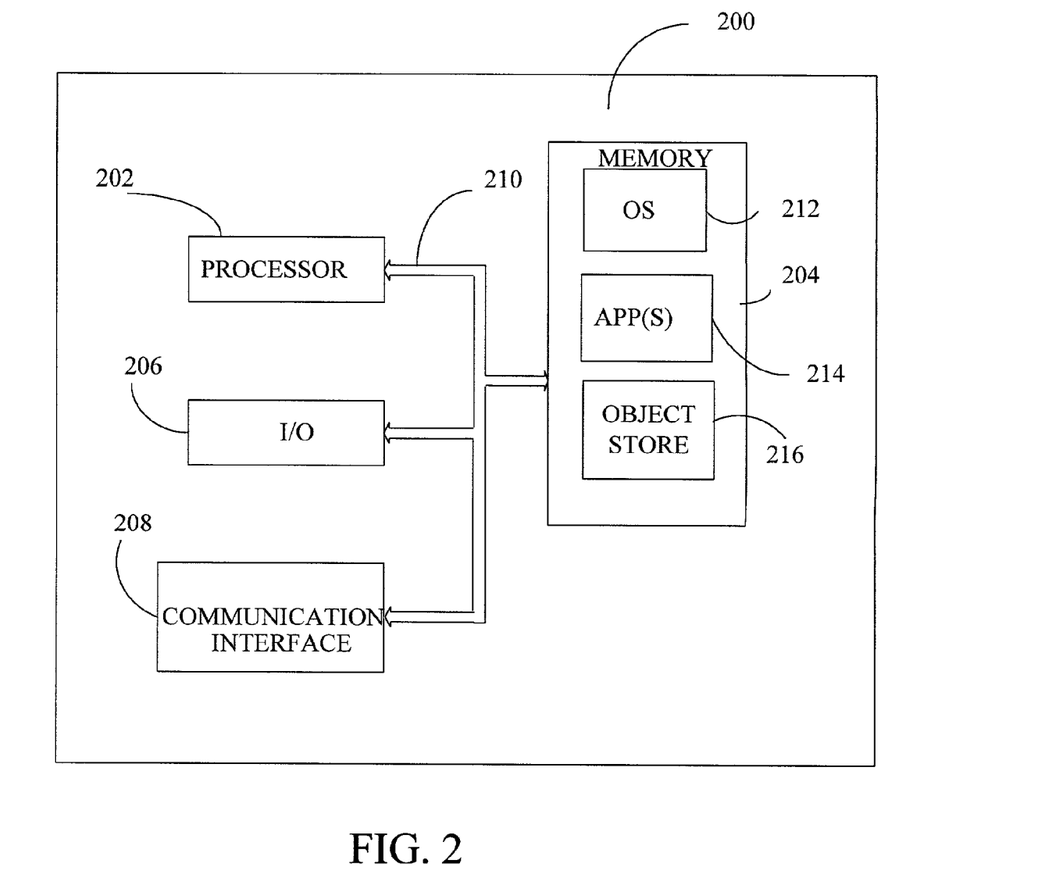
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Under one aspect of the present invention, a system and method are provided that perform speech recognition using articulatory dynamics values. Under the invention, a framework is provided that describes the dependencies between the articulatory dynamics values and other values. In particular, the framework defines the dependency of the articulatory dynamics values on other articulatory dynamics values, articulatory target values, (discrete) values associated with phonological states, and acoustic environment values. As defined under the present invention, these dependencies provide a means for accommodating hypo-articulation, hyper-articulation, slow speech, and fast speech in speech recognition.

The present invention provides a generative model of speech. Under this model, speech is represented as an attempt by the speaker to phonetically implement a linguistic definition of a sequence of phonological units.

Under one embodiment, this model contains four layers: 1) a phonological construct layer that contains discrete values representing the linguistic definition of the phonological units, 2) a segmental articulatory target layer that describes a phonetic target or goal that the speaker is attempting to reach for each linguistic definition, 3) an articulatory dynamics layer that describes how the articulatory mechanism of the speaker behaves, 4) and a clean output signal layer that describes the signal produced by the speaker.

The phonological construct layer consists of a sequence of discrete states, $s_k$, similar to the HMM states of the prior art. Under one embodiment, a sequence of three states represents a single phonological unit. Under the framework provided by the present invention, the probability of a state, $s_k$, is only dependent upon the phonological state, $s_{k-1}$, at the preceding time frame.

The articulatory target layer provides a segmental target model. Under this segmental model, the target is forced to remain constant during a single phonological unit. Thus, the target can only change when there is a transition in the phonological layer from a state that represents a first phonological unit to a state that represents a second phonological unit. At the transition, the present invention defines the probability of a target as a Gaussian distribution that is a function of the state that is being transitioned to. In terms of an equation:

$$p[t(k)|s_k, s_{k-1}, t(k-1)] = \begin{cases} \delta[t(k) - t(k-1)] & \text{if } \text{unit}(s_k) = \text{unit}(s_{k-1}) \\ N(t(k); m(s_k), \sum(s_k)) & \text{otherwise} \end{cases} \qquad \text{EQ. 1}$$

where t(k) and t(k−1) are the targets at time points k and k−1, respectively, $s_k$ and $s_{k-1}$, are the states at time points k and k−1, δ[ ] is a delta function that has a value of infinity when its argument equals zero and a value of zero otherwise, unit( ) symbolizes the phonological unit associated with the state in its argument, and $N(t(k);m(s_k),\Sigma(s_k))$ represents a normal distribution with mean $m(s_k)$ and variance $\Sigma(s_k)$.

Thus, according to equation 1 of the present invention, a value for a current target is dependent upon the value of a previous target, the value of a current state, and the value of a previous state.

The articulatory dynamics layer of the present invention provides a model of the articulatory movement that occurs when the speaker attempts to reach the targets set in the articulatory target layer. Accurate modeling of this movement would require detailed neuromuscular and biomechanical models of the vocal tract, as well as an explicit model of the control objectives and strategies that the speaker is using to reach the articulatory targets. Such models are too complicated to implement directly in speech recognition applications.

The present invention overcomes these problems by assuming that the articulatory mechanism behaves as a linear dynamic system driven by a control input. Based on this assumption, the articulatory dynamics are approximated as the response of a dynamic vocal tract model driven by a target sequence input. This simplifying assumption results in a mathematically tractable, linear, autoregressive (AR) model:

$$z(k+1)=\Phi_s z(k)+(I-\Phi_s) \, t_s(k+1)+w(k) \qquad \text{EQ. 2}$$

where $z(k)$ and $z(k+1)$ are articulatory dynamics values at time points k and k+1, respectively, $t_s(k+1)$ is the target at time point k+1, I is the identity matrix, $\Phi_s$ is a time constant and $w(k)$ is Gaussian noise.

Note that in Equation 2, the target is dependent on the phonological state s as shown in Equation 1 above. The time constant $\Phi_s$, which defines the rate at which the articulatory dynamics values move toward the target, is also dependent on the phonological state s because the rate at which the articulatory mechanisms can change is dependent on their current state.

The next layer in the generative model moves the speech generative process from articulation to distortion-free speech acoustics. Instead of using a detailed high-order model for articulatory-to-acoustic generation, which has expensive computational requirements, the present invention uses a simplifying assumption that the relationship between an articulatory dynamic value and an acoustic value can be modeled as a static memoryless transformation that converts a vector of articulatory parameters into a vector of acoustic parameters. This transformation is represented mathematically as:

$$o(k)=h[z(k)]+v(k) \qquad \text{EQ. 3}$$

where $o(k)$ is the acoustic vector at time point k, $h[\;]$ is a transform, $z(k)$ is the articulatory dynamic value at time point k, and $v(k)$ is observation noise.

Figure 3:
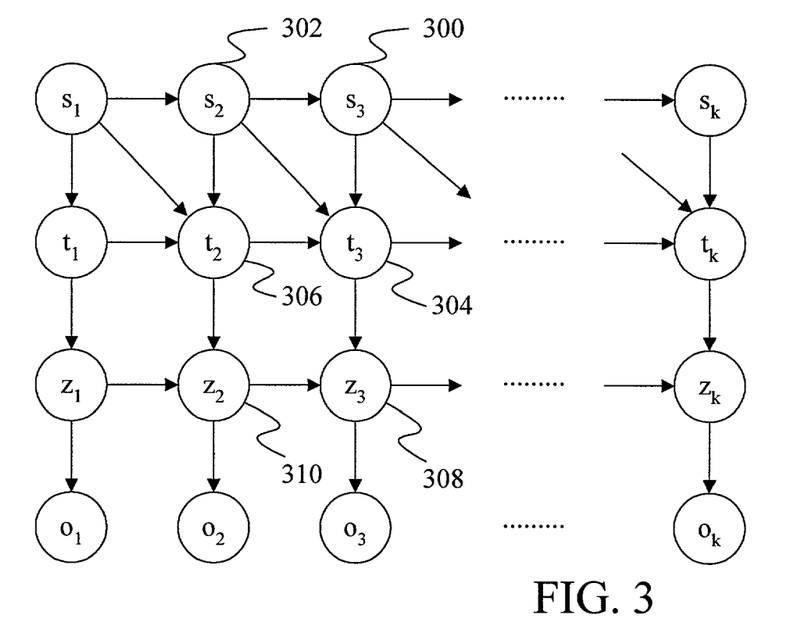
FIG. 3 is a dynamic Bayesian network for a generative speech model under one embodiment of the present invention.

Under one embodiment of the present invention, the generative model described above is represented as a dynamic Bayesian network. A Bayesian network is a graphical model that describes dependencies and conditional independencies in probabilistic distributions defined over a set of random variables. FIG. 3 provides a dynamic Bayesian network that models the generative process described above.

In FIG. 3, each circle represents a value and arrows between circles indicate the dependence of a value on other values. For example, phonological state 300 is shown as being only dependent on phonological state 302. In addition, each column in FIG. 3 represents a separate time k with k increasing from left to right. Thus, phonological state 300 occurs at a later time than phonological state 302.

As shown in FIG. 3, a segmental target, such as target 304, is dependent upon a current phonological state 300, a past phonological state 302, and a past target 306. This is consistent with Equation 1 above where the segmental characteristic of the target requires knowledge of a current and a past phonological state as well as a past target.

In FIG. 3, the articulatory dynamics values are shown as being dependent on a past dynamics value and a current target value. For example, dynamics value 308 is shown as being dependent on past dynamics value 310 and current target value 304. This is consistent with Equation 2 above.

Lastly, the dynamic Bayesian network of FIG. 3 shows that the predicted clean speech value is dependent only on the current dynamics value. For example, speech value 310 is shown as being dependent on dynamics value 308.

The predicted clean speech value calculated using equations 1 through 3 can be used to perform speech recognition. In particular, a sequence of predicted values can be generated for each of a set of hypothesis phonological sequences. Each sequence of predicted values can then be compared to a sequence of input speech values. The phonological units associated with the sequence of predicted values that best matches the sequence of input speech values is then selected as representing the content of the speech signal.

Under one embodiment, the comparison performed for speech recognition is achieved using a number of simplifications. First, the articulatory dynamics vectors, z, are represented as major vocal tract resonances (VTRs) of low dimensionality. The vocal tract resonances are similar to formants but differ in important ways. First, unlike a formant, a VTR is always present in the speech signal, even in unvoiced regions. In addition, VTRs have temporal smoothness between neighboring speech units. The use of VTRs reduces the complexity of utilizing the articulatory dynamic variables by reducing the dimensionality of those variables and by taking the variables from being fully hidden to being only partially hidden since VTRs can be identified in the voiced regions of speech.

The second simplification is to approximate the non-linear transform $h[z(k)]$ of Equation 3 using a piecewise linear model. Using this approximation, equation 3 becomes:

$$o(k)=\dot{H}_m \dot{z}(k)+v(k) \qquad \text{EQ. 4}$$

where $$\dot{H}_m=[a|H] \qquad \text{EQ. 5}$$

$$\dot{z}(k)=[1|z(k)']' \qquad \text{EQ. 6}$$

where [a|H] indicates a left append of a vector a with a transform matrix H, $z(k)'$ is the transpose of matrix $z(k)$, $[1|z(k)']$ indicates a left append of a scalar 1 to row vector $z(k)'$, and $[1|z(k)']'$ indicates the transpose of $[1|z(k)']$.

Using these simplifications, the log-likelihood for an observed sequence o is defined as:

$$L(o\mid\Theta)=\log\left[\sum_{m=1}^{M}\pi_m l_m(o\mid\Theta)\right] \qquad \text{EQ. 7}$$

where m is one of M mixtures of the piecewise linear model, $\Theta$ is a set of parameters trained for the model, $\pi_m$ is a mixture weighting value, and $l_m(o|\Theta)$ is the probability provided by mixture model m defined as:

$$l_m(o|\Theta) = \exp\left[-\frac{1}{2}\sum_{k=1}^{K}\left\{\log\left|\sum_{\tilde{o}_{k,m}}\right| + \tilde{o}_{k,m}\sum_{\tilde{o}_{k,m}}^{-1}\tilde{o}'_{k,m}\right\} + const.\right] \quad \text{EQ. 8}$$

where K is the number of time frames being analyzed, $\tilde{o}_{k,m}$ is the difference between an observed value and a predicted value at the kth frame for the mth mixture and $\Sigma_{\tilde{o}_{k,m}}$ is the covariance of $\tilde{o}_{k,m}$ as determined through a set of training data.

To calculate the predicted value, a value for the target $t_m$, the slope $\Phi_m$, and the transfer function $H_m$, must be trained for each mixture. Under one embodiment, this is performed using an Expectation-Maximization (EM) training algorithm. During each iteration through the EM algorithm, these values are re-estimated as:

$$\hat{t}_m = \frac{(I-\Phi_m)^{-1}\sum_{n=1}^{N}(b_m^n - \Phi_m c_m^n)\cdot\varpi_m^n}{\sum_{n=1}^{N}K_n\cdot\varpi_m^n} \quad \text{EQ. 9}$$

$$\hat{\Phi}_m = \left\{\sum_{n=1}^{N}\left(C_m^n - b_m^n\hat{t}_m' - \hat{t}_m c_m^{n'} + K_n\hat{t}_m\hat{t}_m'\right)\cdot\varpi_m^n\right\}\cdot \quad \text{EQ. 10}$$
$$\left\{\sum_{n=1}^{N}\left(B_m^n - c_m^n\hat{t}_m' - \hat{t}_m c_m^{n'} + K_n\hat{t}_m\hat{t}_m'\right)\cdot\varpi_m^n\right\}^{-1}$$

$$\hat{H}_m = \left\{\sum_{n=1}^{N}\varpi_m^n F_m^n\right\}\left\{\sum_{n=1}^{N}\varpi_m^n G_m^n\right\}^{-1} \quad \text{EQ. 11}$$

where $t_m$ and $\Phi_m$ are values from the previous iteration, $\hat{t}_m$, $\hat{\Phi}_m$ and $\hat{H}_m$ are values calculated for the current iteration, $\varpi_m^n$ is a mixture weighting value, N is the number of tokens in the training data, $K_n$ is the number of frames in nth token, and $b_m^n$, $B_m^n$, $c_m^n$, $C_m^n$, $F_m^n$, and $G_m^n$ are defined as:

$$b_m^n = \sum_{k=1}^{K_n}E_n[z^n(k)|o^n,m] \quad \text{EQ. 12}$$

$$B_m^n = \sum_{k=1}^{K_n}E_n[z^n(k-1)z^n(k-1)'|o^n,m] \quad \text{EQ. 13}$$

$$c_m^n = \sum_{k=1}^{K_n}E_n[z^n(k-1)|o^n,m] \quad \text{EQ. 14}$$

$$C_m^n = \sum_{k=1}^{K_n}E_n[z^n(k)z^n(k-1)'|o^n,m] \quad \text{EQ. 15}$$

$$G_m^n = \sum_{k=1}^{K_n}E_n[\hat{z}^n(k)(\hat{z}^n(k))'|o^n,m] \quad \text{EQ. 16}$$

$$F_m^n = \sum_{k=1}^{K_n}o^n(k)E_n[\hat{z}^n(k)|o^n,m]' \quad \text{EQ. 17}$$

where $E_n[\ ]$ represents a conditional expectation with each conditional expectation calculated as:

$$E_n[z^n(k)z^n(k-1)'|o^n,m]=\Sigma_{k,k-1|K_n,m}^n + E_n[z^n(k)]E_n[z^n(k-1)]' \quad \text{EQ. 18}$$

$$E_n[z^n(k)(z^n(k))'|o^n,m]=\Sigma_{k|K_n,m}^n + E_n[z^n(k)]E_n[z^n(k)]' \quad \text{EQ. 19}$$

$$E_n[z^n(k)|o^n,m]=\hat{z}_{k|K_n,m}^n \quad \text{EQ. 20}$$

where $\Sigma_{k,k-1|K_n,m}^n$ is recursively calculated by $$\Sigma_{k,k-1|K_n,m}^n = \Sigma_{k|k,m}^n M_{k-1,m}^n + M_{k,m}^n(\Sigma_{k+1,k|K_n,m}^n - \Phi_m\Sigma_{k|k,m}^n)M_{k-1,m}^n \quad \text{EQ. 21}$$

for $k = K_n, \ldots, 2$, where $$\Sigma_{K_n,K_n-1|K_n,m}^n = (I - K_{K_n,m}^n H_m)\Phi_m\Sigma_{K_n-1,m}^n \quad \text{EQ. 22}$$

In one embodiment, $K_{k,m}$ is defined through computational steps of a Kalman filtering algorithm that includes the calculation of the following values:

$$\hat{z}_{k|k-1,m}^n = \Phi_m\hat{z}_{k-1|k-1,m}^n + (I-\Phi_m)t_m \quad \text{EQ. 23}$$

$$\Sigma_{k|k-1,m}^n = \Phi_m\Sigma_{k-1|k-1,m}^n\Phi_m + Q_m \quad \text{EQ. 24}$$

$$\tilde{o}_{k,m}^n = o^n(k) - \hat{H}\hat{z}_{k|k-1,m}^n \quad \text{EQ. 25}$$

$$\Sigma_{\tilde{o}_{k,m}}^n = H_m\Sigma_{k|k-1,m}^n H_m' + R_m \quad \text{EQ. 26}$$

$$K_{k,m} = \Sigma_{k|k-1,m}^n H_m'(\Sigma_{\tilde{o}_{k,m}}^n)^{-1} \quad \text{EQ. 27}$$

$$\hat{z}_{k|k,m}^n = \hat{z}_{k|k-1,m}^n + K_{k,m}\tilde{o}_{k,m}^n \quad \text{EQ. 28}$$

$$\Sigma_{k|k,m}^n = \Sigma_{k|k-1,m}^n - K_{k,m}\Sigma_{\tilde{o}_{k,m}}^n K_{k,m}' \quad \text{EQ. 29}$$

Under this embodiment, $M_{k,m}^n$ is defined in the steps of a Kalman smoothing algorithm, which includes the calculation of the following:

$$M_{k,m}^n = \Sigma_{k|k,m}^n\Phi_m'(\Sigma_{k|k-1,m}^n)^{-1} \quad \text{EQ. 30}$$

$$\hat{z}_{k|K_n,m}^n = \hat{z}_{k|k,m}^n + M_{k,m}^n[\hat{z}_{k+1|K_n}^n - \hat{z}_{k+1|k,m}^n] \quad \text{EQ. 31}$$

$$\Sigma_{k|K_n,m}^n = \Sigma_{k|k,m}^n - M_{k,m}^n[\Sigma_{k+1|K_n,m}^n - \Sigma_{k+1|k,m}^n]M_k' \quad \text{EQ. 32}$$

and $Q_m$ and $R_m$ are estimated according to:

$$\hat{Q}_m = \frac{\sum_{n=1}^{N}\sum_{k=1}^{K_n}E_n[e_{k1,m}^n e_{k1,m}^{n'}]\cdot\varpi_m^n}{\sum_{n=1}^{N}K_n\cdot\varpi_m^n} \quad \text{EQ. 33}$$

$$\hat{R}_m = \frac{\sum_{n=1}^{N}\sum_{k=1}^{K_n}E_n[e_{k2,m}^n e_{k2,m}^{n'}]\cdot\varpi_m^n}{\sum_{n=1}^{N}K_n\cdot\varpi_m^n} \quad \text{EQ. 34}$$

with $$\Sigma_{k=1}^{K_n}E_n[e_{k1,m}^n e_{k1,m}^{n'}] = A_m^n + \hat{\Phi}_m B_m^n\hat{\Phi}_m' - C_m^n\hat{\Phi}_m' - \hat{\Phi}_m(C_m^n)' - b_m^n(d_m)' - d_m(b_m^n)' + \hat{\Phi}_m c_m^n(d_m)' + d_m(c_m^n)'\hat{\Phi}_m' + K_n d_m d_m' \quad \text{EQ. 35}$$

$$\Sigma_{k=1}^{K_n}E_n[e_{k2,m}^n e_{k2,m}^{n'}] = D^n - F_m^n\hat{H}_m' - \hat{H}_m(F_m^n)' + \hat{H}_m G_m^n\hat{H}_m' \quad \text{EQ. 36}$$

where $B_m^n$, $b_m^n$, $C_m^n$, $c_m^n$, $F_m^n$, and $\hat{H}_m$ are determined as shown above in equations 11-17 and $A_m^n$, $D^n$, and $d_m$ are defined as:

$$A_m^n = \sum_{k=1}^{K_n} E_n[z^n(k)z^n(k)' \mid o^n, m] \qquad \text{EQ. 37}$$

$$D^n = \sum_{k=1}^{K_n} o_n(k)(o^n(k))' \qquad \text{EQ. 38}$$

$$d_m = (I - \hat{\Phi}_m)\hat{t}_m \qquad \text{EQ. 39}$$

Once $H_m$, $t_m$, and $\Phi_m$ have been trained for each mixture component, the predicted speech value for a phonological unit can be calculated as:

$$o_{predicted}(k) = \hat{H}\hat{z}_{k|k-1,m}^n \qquad \text{EQ. 40}$$

where $\hat{z}_{k|k-1,m}^n$ is taken from equation 23 above.

Figure 4:
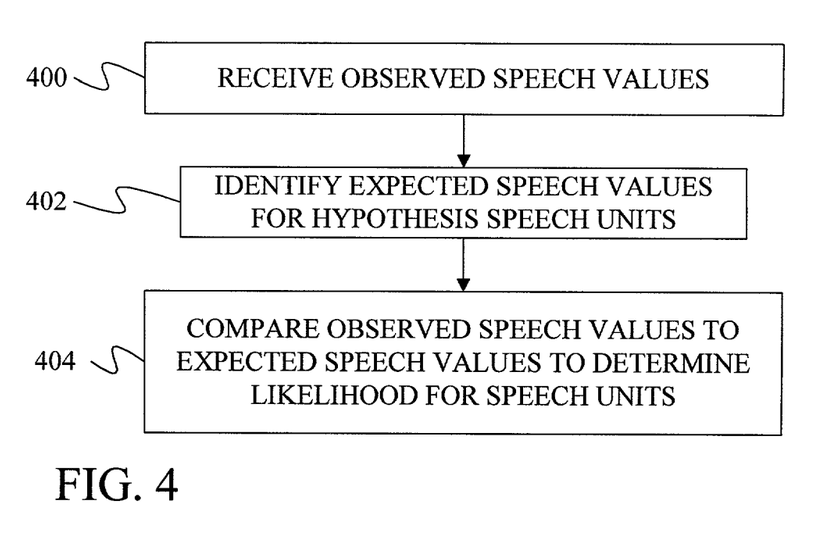
FIG. 4 is a flow diagram of a method of speech recognition under one embodiment of the present invention.

Thus, as shown in the flow diagram of FIG. 4, one embodiment of the present invention performs speech recognition by receiving a sequence of observed speech values at step 400 and identifying a sequence of predicted speech values at step 402 for a hypothesis speech unit. As shown by equation 23 and 40, step 402 calculates the predicted speech values using an articulatory variable, z, that is dependent on the value of an articulatory variable at a previous time and an articulation target, t. At step 404, equations 7 and 8 above are used to compare the observed speech values to the predicted speech values to determine a likelihood for the hypothesis speech unit.

In a second embodiment of the invention, a more complex model of the phonological state is used. In particular, the single tier of phonological states shown in FIG. 3 is separated into five semi-independent tiers of phonological states. For example, the five tiers can respectively represent states for the lips, tongue blade, tongue body, velum, and larynx. Each tier has some number of available states, wherein the number of available states can be different for different tiers. For example, in one embodiment, the lips tier and the tongue blade tier each have six available states, the tongue body tier has seventeen available states, and the velum tier and larynx tier each have two available states. The tiers are considered semi-independent of each other because some combinations of states are forbidden to keep the model from assuming states that cannot happen in the vocal tract.

Under embodiments in which there are multiple tiers of phonological states, the target becomes dependent on each of the separate tiers such that Equation 1 above becomes $$p[t(k) \mid s_k, s_{k-1}, t(k-1)] = \begin{cases} \delta[t(k) - t(k-1)] & \text{if } \text{unit}(s_k) = \text{unit}(s_{k-1}) \\ N(t(k); m(s_k), \sum(s_k)) & \text{otherwise} \end{cases} \qquad \text{EQ. 41}$$

where $s_k$ and $s_{k-1}$ respectively represent a current combination of the phonological states across all of the tiers and a past combination of phonological states across all of the tiers.

Figure 5:
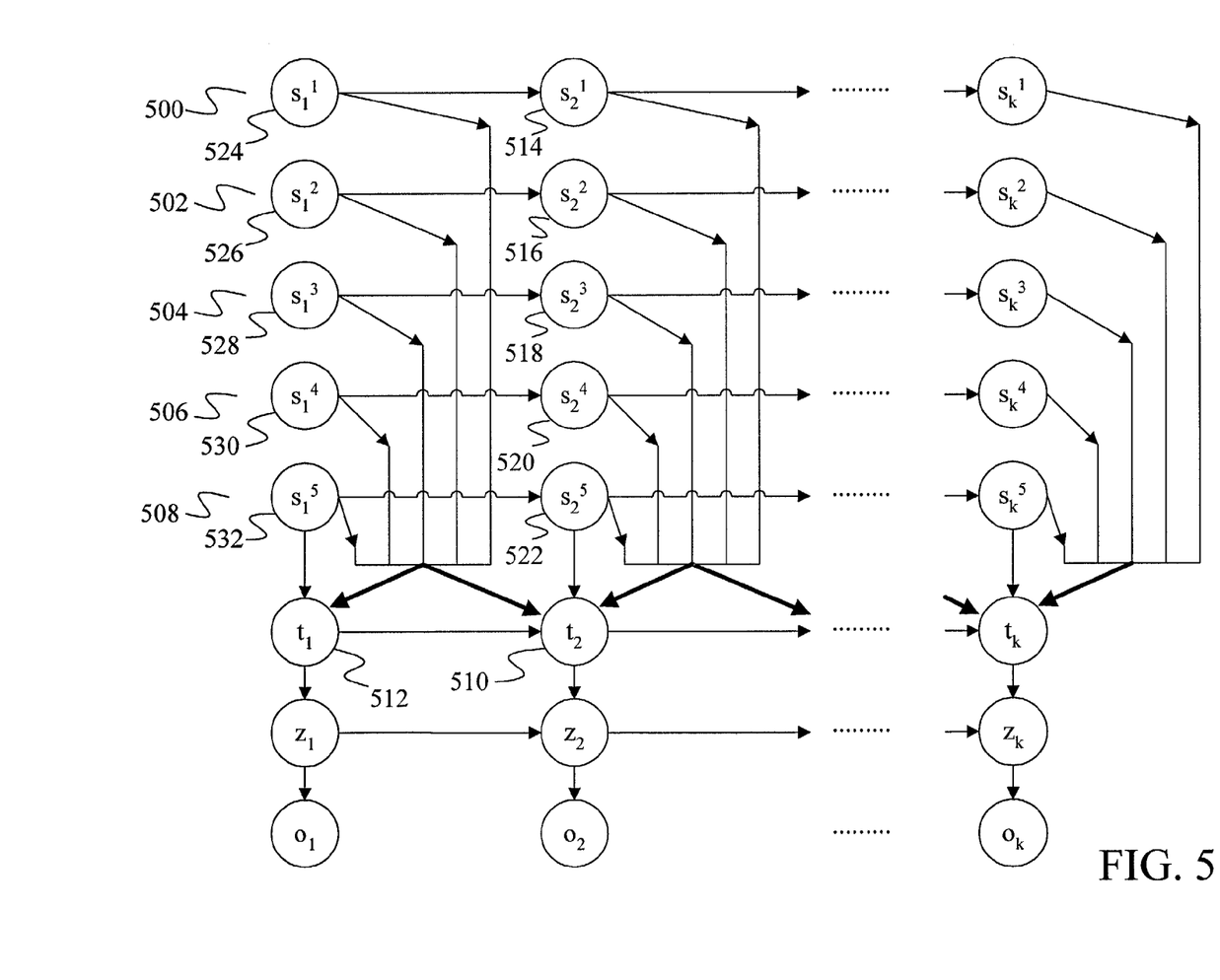
FIG. 5 is a dynamic Bayesian network for a generative speech model under a second embodiment of the present invention.

FIG. 5 provides a dynamic Bayesian network for an embodiment of the invention in which there are multiple tiers 500, 502, 504, 506, and 508 of phonological states. In FIG. 5, each target, such as target 510, is dependent on a previous target, such as target 512, a collection of current states, such as states 514, 516, 518, 520, and 522, and a collection of past states, such as states 524, 526, 528, 530, and 532. The other dependencies shown in FIG. 5 are similar to those described above for FIG. 3.

In a third embodiment of the present invention, the articulatory dynamics variable, z, is defined as being dependent on external additive noise and a channel distortion associated with the environment in which the speaker is located. These dependencies are based on the observation that speakers modify their speech based on the background noise and distortion present in the environment. In particular, as noise or distortion increases, speakers tend to hyper-articulate their speech so that it can be better understood.

In equation 2, this dependency is found in the Gaussian noise factor w(k) and in $\Phi_s$, which is defined as depending on noise and distortion under this embodiment. Thus, equation 2 becomes:

$$z(k+1) = \Phi_{s,n,h}z(k) + (I - \Phi_{s,n,h})t_s(k+1) + w_n(k) \qquad \text{EQ. 42}$$

where $\Phi_{s,n,h}$ is a time constant that is dependent on the phonological state s, a current noise state n, and a current distortion state h.

Figure 6:
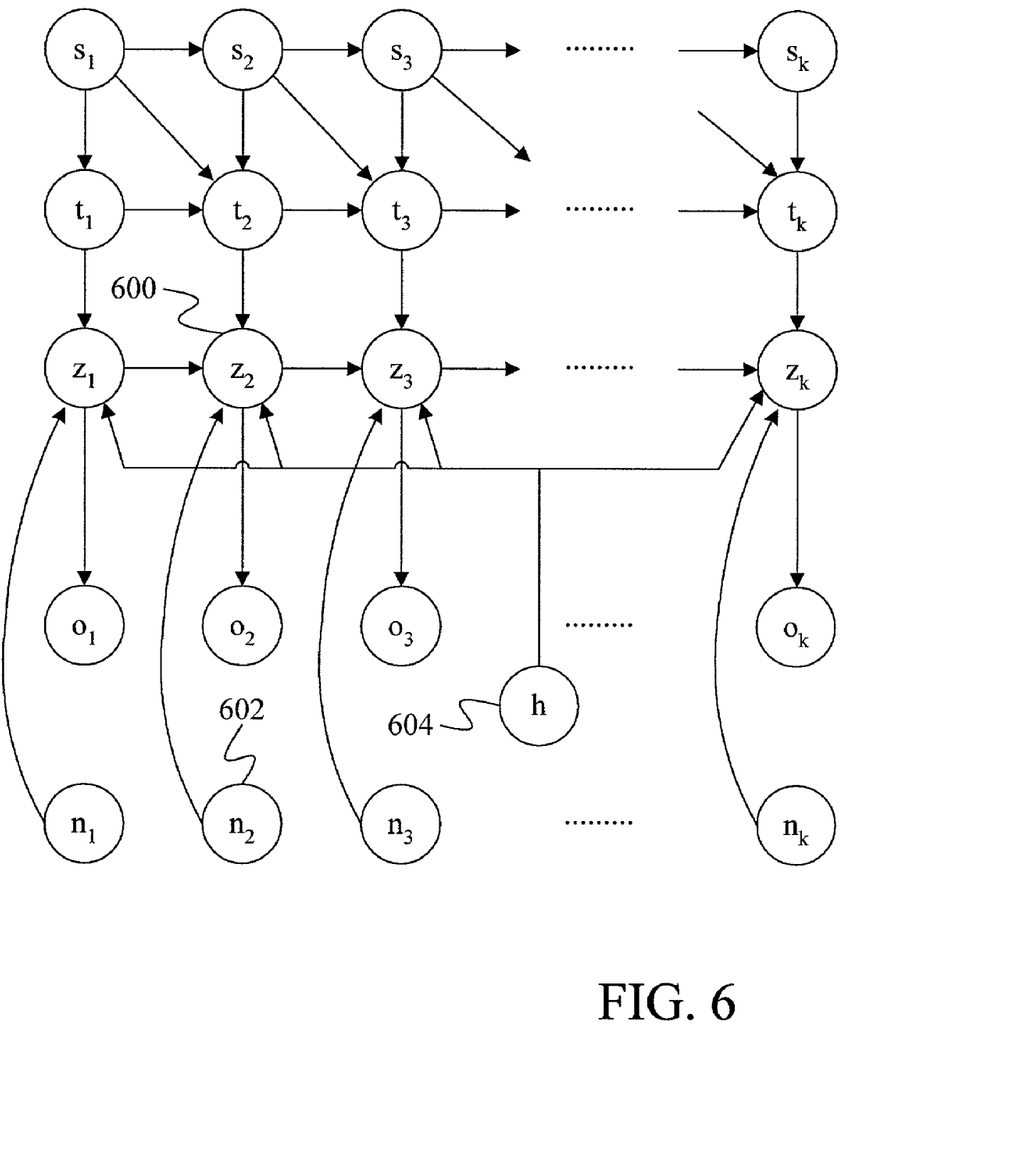
FIG. 6 is a dynamic Bayesian network for a generative speech model under a third embodiment of the present invention.

FIG. 6 provides a dynamic Bayesian model in which the articulatory dynamics values are dependent upon the environment noise and channel distortion. In particular, the articulatory dynamics values, such as value 600, are dependent on a current noise value, such as noise value 602, and a current channel distortion value, such as distortion value 604. In FIG. 6, the distortion is considered to be stationary such that it does not change over the time span of the speech utterance. For simplicity, only a one-tiered rather than a multi-tiered phonological model is shown. However, those skilled in the art will recognize that a multi-tiered phonological model may be used in the Bayesian network of FIG. 6.

By modeling the articulatory dynamics values and by identifying the dependencies of those values, the present invention allows a speech recognition system to be trained such that speech can be recognized even during hypo-articulation, hyper-articulation, slow speech and fast speech. One benefit of using the framework above is that in most cases, the target remains the same for a variety of articulation styles including normal speech, hypo-articulated speech, hyper-articulated speech, slow speech, and fast speech. For example, FIGS. 7, 8, 9, 10, 11 and 12 show articulatory targets and articulatory dynamics (trajectories) for the articulation of the same phonological units under normal speech, hypo-articulated speech, hyper-articulated speech, slow speech and fast speech, respectively. In these figures, the values for the targets and the trajectories are shown along the vertical axis and time is shown along the horizontal axis.

Figure 7:
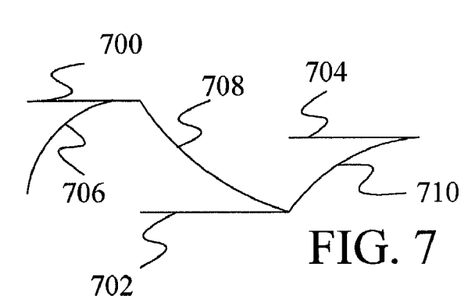
FIG. 7 is an illustration (not precise) of target and trajectory for a normal articulation style of speech.

In the normal speech of FIG. 7, there are three targets 700, 702, and 704, and three trajectories 706, 708, and 710. Note that trajectories 706, 708, and 710 move toward the targets asymptotically as described by equations 2 and 39 above.

Figure 8:
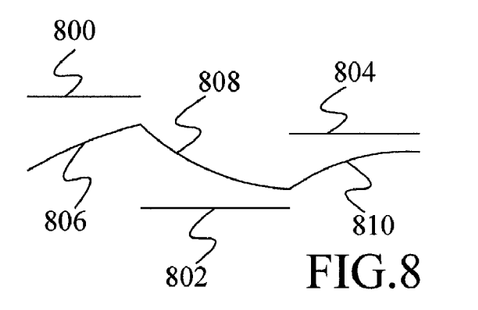
FIG. 8 is a target and trajectory diagram for a hypo-articulation style of speech.
Figure 9:
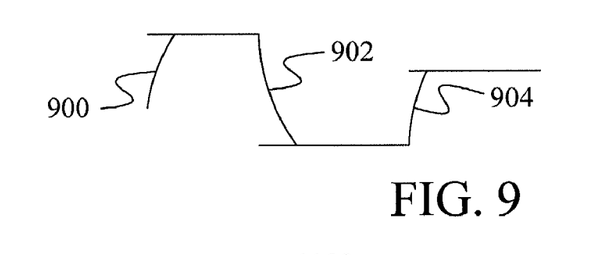
FIG. 9 is a target and trajectory diagram for a hyper-articulation style of speech.

In the hypo-articulated speech of FIG. 8, targets 800, 802, and 804 remain the same as targets 700, 702, and 704, but the trajectories change to trajectories 806, 808 and 810. In particular, during the hypo-articulated speech of FIG. 8, the speaker uses less effort to reach the targets so that trajectories 806, 808, and 810 do not reach their targets before the next trajectory begins. Note that although trajectories 806, 808, and 810 are different from trajectories 706, 708, and 710, the targets remain the same. However, the time constant $\Phi_s$ is different in hypo-articulated speech than in normal speech.

In the hyper-articulated speech of FIG. 9, the targets again remain the same, but the time constant of the trajectories 900 902, and 904 changes so that the trajectories reach their targets faster. To reach the targets faster, the speaker is using more effort to make the speech clear. In some cases, this effort results in target overshoot (not shown) in which the trajectory passes through the target briefly before moving back toward the target. As noted above, the changes made during hyper-articulation are often made in response to a noise or distortion in the surrounding environment.

Figure 10:
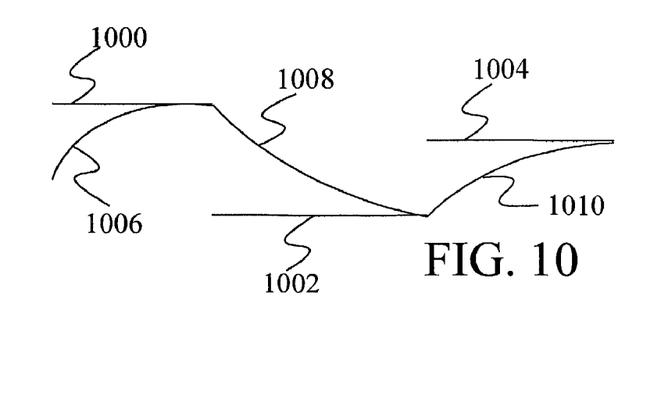
FIG. 10 is a target and trajectory diagram for a slow articulation style of speech.

In FIG. 10, the trajectories and targets of slow speech are shown. During slow speech, targets 1000, 1002, and 1004 are at the same level as normal speech targets 700, 702, and 704. However, the targets extend for a longer time reflecting the fact that the speaker is extending each phonological unit. As shown in trajectories 1006, 1008, and 1010, the speaker also changes the time constant during slow speech so that the trajectories approach the targets at a slower rate.

Figure 11:
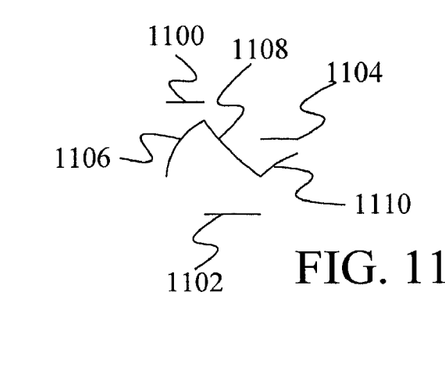
FIG. 11 is a target and trajectory diagram for a fast articulation style of speech.

In the fast speech of FIG. 11, the speaker uses targets 1100, 1102 and 1104, which are at the same level as targets 700, 702, and 704 of normal speech but that have a shorter duration. Because of the shorter duration, trajectories 1106, 1108, and 1110 do not have time to reach the targets. However, during the time that the trajectories are moving toward the targets, they have the same time constant as in normal speech.

Since the targets remain at the same levels in each of these cases, training data containing normal speech, hypo-articulated speech, hyper-articulated speech, slow speech, and fast speech can be used to train the same targets. This improves the accuracy of the targets by providing more data with which to train them. In addition, changes to the time constant that occur during non-normal speech can be modeled using training speech that includes examples of the non-normal speech styles such as hypo-articulated speech, hyper-articulated speech, slow speech, and fast speech. The resulting articulatory dynamics values produced from these trained values will then represent the dynamic articulation that will be present during non-normal speech. As a result, the predicted speech values produced from the articulatory dynamics values will better match the observed speech produced during hypo-articulation, hyper-articulation, slow speech, and fast speech.

In the examples discussed above, hyper-articulated speech was described as producing a change in the time constant without changing the level of the target. The present inventor also recognizes that hyper-articulated speech can occur when the user shifts the target level to better distinguish similar sounds. In such cases, training data would need to be collected that includes such target shifts.

Figure 12:
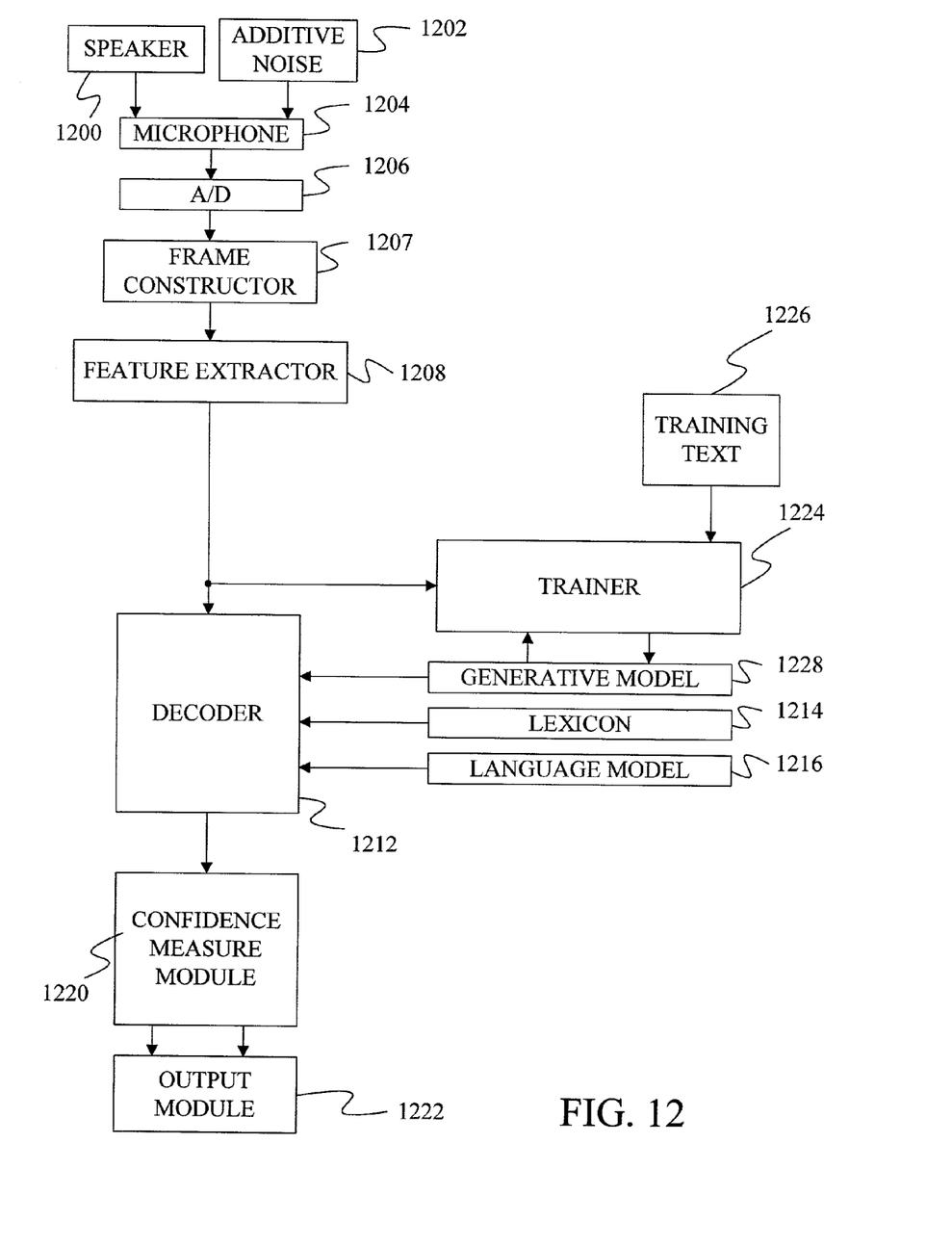
FIG. 12 is a block diagram of a speech recognition system under one embodiment of the present invention.

FIG. 12 provides a block diagram of a speech recognition system in which the present invention can be used. In FIG. 12, a speaker 1200, either a trainer or a user, speaks into a microphone 1204. Microphone 1204 also receives additive noise from one or more noise sources 1202. The audio signals detected by microphone 1204 are converted into electrical signals that are provided to analog-to-digital converter 1206.

A-to-D converter 1206 converts the analog signal from microphone 1204 into a series of digital values. In several embodiments, A-to-D converter 1206 samples the analog signal at 16 kHz and 16 bits per sample, thereby creating 32 kilobytes of speech data per second. These digital values are provided to a frame constructor 1207, which, in one embodiment, groups the values into 25 millisecond frames that start 10 milliseconds apart.

The frames of data created by frame constructor 1207 are provided to feature extractor 1208, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

If the input signal is a training signal, this series of feature vectors is provided to a trainer 1224, which uses the feature vectors and a training text 1226 to train the generative model 1228 of the present invention. For example, the EM training algorithm described above may be used to train the generative model.

If the input signal is a test signal, the feature vectors are provided to a decoder 1212, which identifies a most likely sequence of words based on the stream of feature vectors, a lexicon 1214, a language model 1216, and the generative model 1228.

The most probable sequence of hypothesis words is provided to a confidence measure module 1220. Confidence measure module 1220 identifies which words are most likely to have been improperly identified by the speech recognizer, based in part on a secondary acoustic model(not shown). Confidence measure module 1220 then provides the sequence of hypothesis words to an output module 1222 along with identifiers indicating which words may have been improperly identified. Those skilled in the art will recognize that confidence measure module 1220 is not necessary for the practice of the present invention.

Although the present invention has been described with reference to particular embodiments, workers skilled in the art will recognize that changes may be made in form and detail without departing from the spirit and scope of the invention.

What is claimed is:

1. A method of speech recognition, the method comprising:
   receiving an observable value that describes a portion of a speech signal;
   identifying a predicted value for a hypothesis phonological unit using an articulatory dynamics value that depends on an articulatory dynamics value at a previous time and an articulation target; and
   comparing the observed value to the predicted value to determine a likelihood for the hypothesis phonological unit.

2. The method of claim 1 wherein the articulation target depends on a phonological state.

3. The method of claim 2 wherein the articulation target depends on a combination of phonological states.

4. The method of claim 3 wherein the articulation target depends on a combination of five phonological states.

5. The method of claim 2 wherein the articulation target further depends on a previous articulation target.

6. The method of claim 1 wherein the articulation target depends on a current phonological state and a previous phonological state.

7. The method of claim 6 wherein the articulation target further depends on a combination of current phonological states and a combination of previous phonological states.

8. The method of claim 1 wherein the articulatory dynamics value further depends on a noise value.

9. The method of claim 1 wherein the articulatory dynamics value further depends on a distortion value.

10. The method of claim 1 wherein the articulatory dynamics value depends on a time constant.

11. The method of claim 10 wherein the time constant is trained using hyper-articulated training speech.

12. The method of claim 10 wherein the time constant is trained using hypo-articulated training speech.

13. A method of speech recognition comprising;
determining a predicted acoustic value for a phonological unit by utilizing an articulatory value that describes a dynamic aspect of a speech signal and that depends in part on an acoustic environment value and wherein the articulatory value further depends on a value of an articulatory target; and
using the predicted acoustic value to determine the probability that an observed acoustic value represents the phonological unit.

14. The method of claim 13 wherein the acoustic environment value comprises a noise value.

15. The method of claim 13 wherein the acoustic environment value comprises a distortion value.

16. The method of claim 13 wherein the articulatory value further depends on an articulatory value of the previous time frame.

17. The method of claim 13 wherein the articulatory target is trained for a phonological unit.

18. The method of claim 17 wherein the articulatory target depends on a phonological state.

19. The method of claim 17 wherein the articulatory target depends on multiple tiers of phonological states.

20. The method of claim 13 wherein the articulatory value further depends on a time constant that is trained for a combination of a phonological unit and an acoustic environment.

21. The method of claim 13 wherein the articulatory value further depends on a time constant that is trained using hyper-articulated speech.

22. The method of claim 13 wherein the articulatory value further depends on a time constant that is trained using hypo-articulated speech.

23. The method of claim 13 wherein the articulatory value further depends on a time constant that is trained using fast speech.

24. The method of claim 13 wherein the articulatory value further depends on a time constant that is trained using slow speech.

25. A computer-readable medium having computer-executable instructions for performing steps comprising:
selecting a hypothesis speech unit;
identifying an articulatory target based on the hypothesis speech unit;
selecting a time constant from a group of time constants that have been trained using speech constructed through a variety of articulation styles;
using the articulatory target and the time constant to determine a predicted speech value; and
comparing the predicted speech value to an observed speech value to determine a likelihood that the hypothesis speech unit is represented by the observed speech value.

26. The computer-readable medium of claim 25 wherein the variety of articulation styles comprises hyper-articulation.

27. The computer-readable medium of claim 25 wherein the variety of articulation styles comprises hypo-articulation.

28. The computer-readable medium of claim 25 wherein the variety of articulation styles comprises slow speech.

29. The computer-readable medium of claim 25 wherein the variety of articulation styles comprises fast speech.

30. The computer-readable medium of claim 25 wherein selecting a time constant comprises selecting a time constant based in part on the hypothesis speech unit.

31. The computer-readable medium of claim 25 wherein selecting a time constant comprises selecting a time constant based in part on an environment value.

32. The computer-readable medium of claim 31 wherein selecting a time constant based in part on an environment value comprises selecting a time constant based on a noise value.

33. The computer-readable medium of claim 31 wherein selecting a time constant based in part on an environment value comprises selecting a time constant based on a distortion value.

* * * * *